July 12, 1927.
L. L. LOMAR
1,635,284
SHOCK ABSORBER
Filed Aug. 26 1926
2 Sheets-Sheet 2
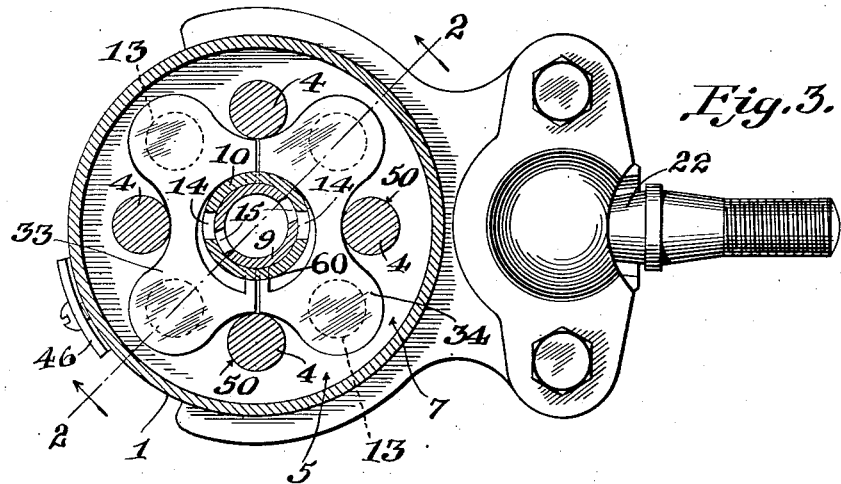
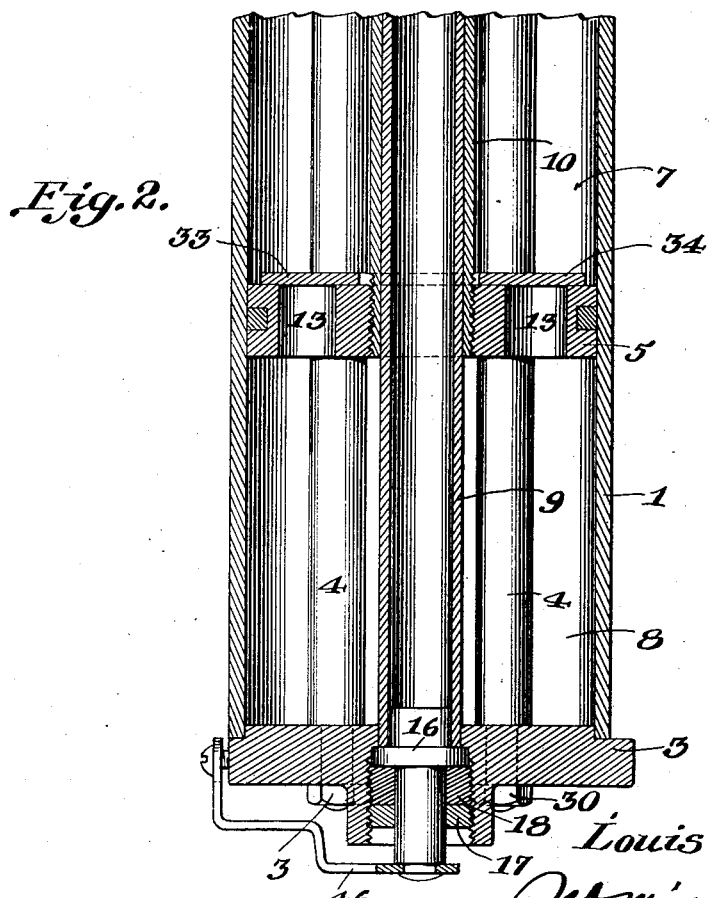
Inventor
Louis L. Lomar
By J. W. Milburn
Attorney Patented July 12, 1927.

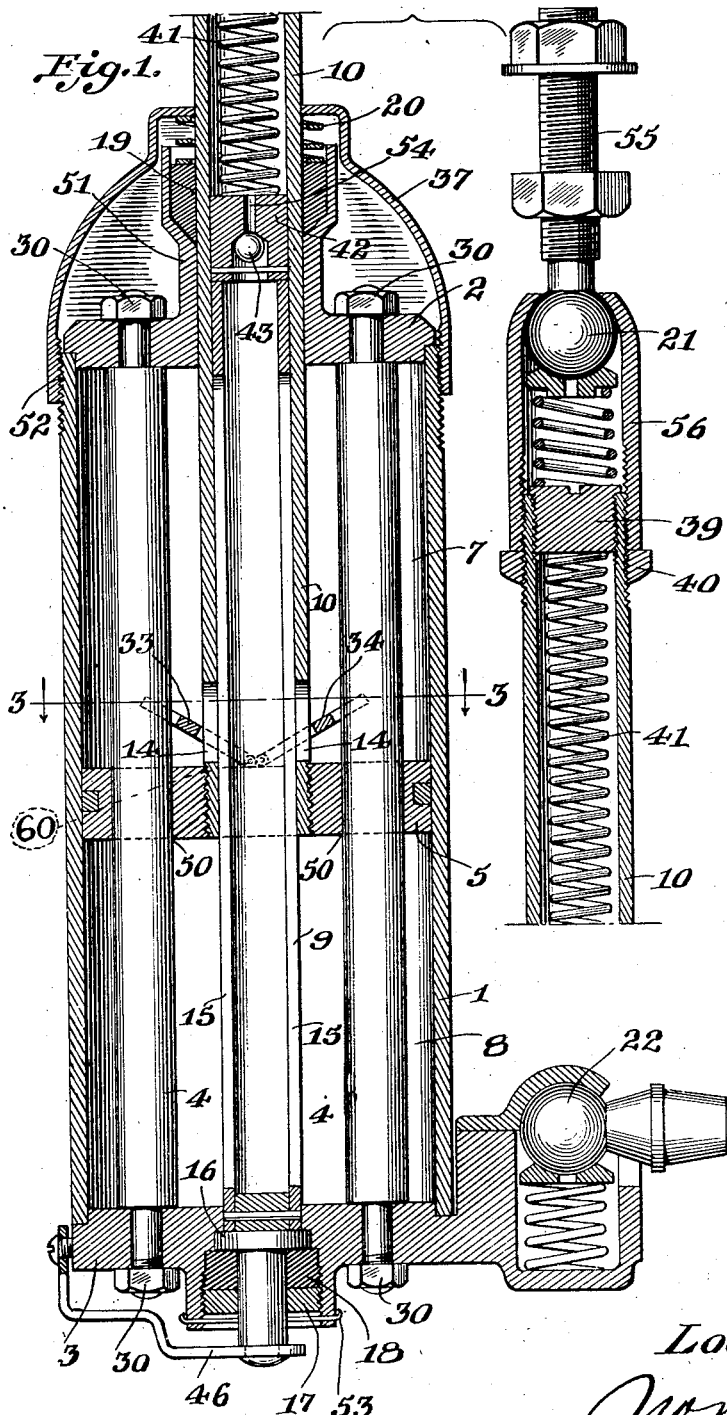

1,635,284

UNITED STATES PATENT OFFICE.

LOUIS L. LOMAR, OF HOUSTON, TEXAS.

SHOCK ABSORBER.

Application filed August 26, 1926. Serial No. 131,683.

My invention relates to shock absorbers adapted to be used upon automobiles and other vehicles and upon various other structures in which cushioning of the relative movement of associated parts is desirable. More particularly, my invention relates to shock absorbers of the fluid type, and is a modification of the general construction of shock absorber of that type disclosed in my copending application, Serial No. 68,420, filed November 11, 1925.

The principal object of my invention is the provision of a shock absorber of the type referred to which will be simple in construction and operation, but which will effect a gradual cushioning of both the shock and the rebound.

Further objects of the invention are the provision of improved means for effecting the cushioning action gradually and smoothly, and the provision of means for regulating the speed and degree of the cushioning action, and for adjusting the device for use with different loads and operating conditions.

My invention is illustrated in the accompanying drawings, in which:—

Figure 1 is a vertical sectional view of the shock absorber,

Figure 2 is a similar view, taken on line 2—2 of Figure 3,

Figure 3 is a horizontal sectional view taken on line 3—3 of Figure 1, and

Figure 4 is a detail view of the valve means associated with the hollow piston rod.

My present invention comprises a casing 1, preferably cylindrical, a piston 5 slidably fitted therein and carried by a hollow piston rod 10, provided with apertures 14 in its walls and a spring-pressed plunger 42 in its bore, and an apertured tubular valve member 9 adjustably mounted within the casing and extending within the hollow piston rod 10.

The ends of the casing are closed by caps 2 and 3, tightly clamped upon the casing by nuts 30 screwed upon the reduced screw-threaded ends of rods 4, which are also clamped between caps 2 and 3. The rods 4 pass through openings 50 in piston 5, and serve to guide the piston in its movement and prevent it from turning.

The piston 5 is provided with apertures 13, controlled by valves 33, 34, hingedly mounted so as to permit free passage of fluid through the apertures while the piston is moving downwardly. The valves may be hinged to the piston rod, as at 60.

The inner end of the piston rod 10 extends through, and is screwed into or otherwise secured in an opening in piston 5. The open end of the hollow piston rod 10, together with apertures 14 in its walls, preferably oppositely disposed and preferably adjacent the piston, afford an auxiliary communicating passage between the fluid chambers 7 and 8 on opposite sides of the piston.

Regulation of the flow of fluid through this passageway is effected by means of the hollow valve stem 9, provided with one or more longitudinal slots 15 in its walls, each preferably enlarged at its middle portion, as at 45, and gradually tapering in width toward each end. Valve 9 is mounted in an opening provided for it in casing cap 3, and, when in position, extends into the open end of hollow piston rod 10, with which it is in close telescopic engagement.

The valve 9 is rotatably secured in position by a rib 16 on the valve rotatably held against a shoulder upon cap 3 by means of a packing washer 18, compressed by a screw cap 17. If desired, the parts may be further secured against accidental displacement by a cotter pin 53.

By means of an arm 46 attached to its reduced outer end, valve 9 may be rotated to vary the relative position of the slots 15 with respect to the apertures 14 in the walls of the hollow piston rod 10. By this means the valve 9 may be readily adjusted, from the exterior of the casing, to open or close the passage through slot 15 and aperture 14 to any desired degree, and thus regulate the degree of resistance to flow of fluid between chambers 7 and 8. This regulation is of particular importance in controlling the action of the device during the upward movement of the piston, at which time the openings 13 are closed and passage of fluid between the chambers 7 and 8 is necessarily through apertures 14 alone.

The casing, with its caps 2 and 3, is adapted to contain oil or other fluid, its interior being divided by piston 5 into the opposed fluid chambers 7 and 8.

The hollow piston rod 10 is slidable through a guide sleeve 51, carried by cap 2, and the escape of fluid around the piston rod is prevented by suitable packing 19, compressed by a spring 20 held against the packing by the cover plate 37 secured to casing 1, preferably by a screw-threaded connection 52 therewith.

The bore of the hollow piston rod 10 is closed at its outer end by a screw plug 39, which also acts as an abutment for a coil spring 41 disposed within the bore and in engagement at its opposite end with a plunger 42, provided with an aperture 54 controlled by a check valve 43. The plunger 42, under the influence of spring 41, is adapted to seat upon the upper end of the valve tube 9, or upon the column of fluid in the hollow piston rod, and act as an auxiliary resistance element to provide additional cushioning means during the downward movement of the piston rod 10 and piston 5. The portion of the hollow piston rod above plunger 42 may be used as a reservoir chamber for the oil or other fluid used in the device, the valved plunger 42, under the influence of spring 41, maintaining a pressure upon the body of fluid in the casing and, through valve 43, supplying additional fluid to the casing when necessary. By this means the casing is kept constantly full of fluid.

In use, the fluid casing and the hollow piston rod of my device are designed and adapted to be attached to relatively movable parts of a vehicle. Any suitable connecting means may be employed. In the drawings I have shown, by way of example, a shackle bolt 55 connected to the end of the piston rod 10 by an ordinary form of universal joint 21, adjustment being permitted by the screw-threaded connection of nut 40 and housing 56 with the piston rod. In the preferred embodiment of my invention the fluid casing is attached to the vehicle through a joint connection 22, the housing for which is formed as an integral extension of the casing cap 3.

The casing, through connection 22, may be secured to the axle of an automobile, and the piston rod 10, through connection 21, to the automobile frame, but this manner of attachment and use of the invention is merely illustrative, as the piston rod and casing may be connected to any relatively movable parts of a vehicle or similar structure.

The manner of operation of my invention is as follows:—Under ordinary running conditions, over relatively smooth roads, the resulting shocks will be taken up by the automobile springs, and the relatively slight shocks which may be transmitted to the shock absorber will cause only a relatively short travel of the piston 5 in either direction. The piston movement within these narrow limits will be accommodated by the comparatively free passage of fluid between fluid chambers 7 and 8. While the piston 5 is in this central or neutral zone, the fluid is permitted to pass freely through openings 13 and also through the central passage through aperture 14 and the enlarged portion 45 of slot 15 in valve tube 9. This neutral zone exists only while the variations in the surface of the road are slight. When greater unevenness is met with, the travel of the piston is increased, the aperture 14 is gradually moved out of register with the enlarged opening 45, and the passage of fluid through aperture 14 is restricted to that quantity which can pass through the gradually narrowing slot 15 in tube 9.

When the automobile encounters an irregularity in the road surface, piston rod 10 and piston 5 are forced downwardly and fluid passes through openings 13 and through the central passage formed by the open end of the hollow piston rod, slot 15 and aperture 14. As the piston rod and piston continue to move downwardly the passage of fluid through aperture 14 is gradually restricted by the gradual decrease in area of the slot 15 which registers with opening 14. This continued downward movement is also cushioned by the action of the spring-pressed plunger 42. Upon its downward stroke the piston rod 10, moving into the chamber 8, gradually displaces a certain quantity of fluid, which is forced through opening 14 and slot 15 into the bore of the piston rod beneath plunger 42, in opposition to the force exerted against the plunger by spring 41. By means of the gradually increasing resistances thus offered by slot 15 and spring 41, the downward movement of piston 5 is gradually checked and stopped.

As the piston begins its upward travel, caused by the rebound of the automobile springs, valves 33 and 34 are closed and passage of fluid through openings 13 is prevented. Fluid is then compelled to pass from one fluid chamber to the other entirely through opening 14 in the piston rod 10 and slot 15 in the valve 9, the flow of fluid permitted through this passage being relatively small and restricted, as compared with that allowed by the larger openings 13. Because of the tapering of the slot 15 the opening 14 is gradually closed. Thus the upward or rebound motion of the body of the automobile, which otherwise would be too rapid and violent, is effectively retarded and gradually checked.

I claim:—

1. In a device of the character described, a casing adapted to contain a fluid, a piston within said casing, a hollow piston rod open to the interior of the casing on one side of said piston and having an aperture in its wall on the opposite side of the piston, a tubular valve mounted in said casing and extending into said hollow piston rod, said valve having a slot in its wall adapted to register with the aperture in said piston rod, said casing and said piston rod being adapted to be connected to relatively movable parts of a vehicle.

2. In a device of the character described, a casing adapted to contain a fluid, a piston within said casing, a piston rod, said piston rod and said piston having a conduit therein open to the interior of said casing on one side of the piston, said piston rod having an aperture in its wall providing a communication between said conduit and the interior of said casing on the opposite side of the piston, and a tubular valve in said casing extending into said conduit, said valve having an opening in its wall and being axially adjustable to bring said opening into or out of register with the aperture in said piston rod, said casing and said piston rod being adapted to be connected to relatively movable parts of a vehicle.

3. In a device of the character described, a casing adapted to contain a fluid, a piston within said casing, said piston having an opening therethrough, a piston rod having a conduit therein in communication with the opening through said piston, said piston rod having an aperture in its wall, and a tubular valve in said casing extending into said conduit, said valve having a tapered slot in its wall adapted to register with the aperture in said piston rod, said casing and said piston rod being adapted to be connected to relatively movable parts of a vehicle.

4. In a device of the character described, a casing adapted to contain a fluid, a piston in said casing, said piston having an opening therethrough, a piston rod having a conduit therein in communication with the opening through said piston and having an aperture in its wall, and a tubular valve in said casing extending into said conduit, said valve having a longitudinal slot in its wall gradually tapering in width from its middle portion to each end and adapted to register with the aperture in said piston rod, said casing and said piston rod being adapted to be connected to relatively movable parts of a vehicle.

5. In a device of the character described, a casing adapted to contain a fluid, a piston in said casing, said piston having an opening therethrough, a piston rod having a conduit in communication with said piston opening and an aperture in its wall, and a tubular valve in said casing extending into said conduit, said valve having a longitudinal opening in its wall substantially the size of said piston rod aperture at its middle portion and tapering in width toward either end, said casing and said piston rod being adapted to be connected to relatively movable parts of a vehicle.

6. In a device of the character described, a casing adapted to contain a fluid, a piston in said casing, said piston having an opening therethrough, a piston rod having a conduit in communication with said piston opening and an aperture in its wall, and a tubular valve in said casing extending into said conduit, said valve having a slot in its wall and being adjustable to bring said slot into or out of register with said aperture in said piston rod, said casing and said piston rod being adapted to be connected to relatively movable parts of a vehicle.

7. In a device of the character described, a casing adapted to contain a fluid, a piston in said casing, a hollow piston rod having in said casing, a hollow piston rod having an aperture in its wall and its inner end open to the interior of the casing through said piston, a tubular valve adjustably mounted in said casing and extending into said hollow piston rod, said valve having an opening in its wall adapted to be brought into and out of register with the aperture in said piston rod, and guide rods secured within said casing and extending through suitable openings in said piston, said piston being provided with an auxiliary passage therethrough, and a check valve controlling said passage, said casing and said piston rod being adapted to be connected to relatively movable parts of a vehicle.

8. In a device of the character described, a casing adapted to contain a fluid, a piston in said casing having an opening therethrough, a hollow piston rod having oppositely disposed apertures in its wall and communicating with the interior of the casing through said piston opening on the opposite side of said piston, and a tubular valve mounted in said casing and axially adjustable therein, said valve extending into said hollow piston rod and having oppositely disposed longitudinal slots in its wall gradually tapering in width from the middle portion toward each end, to provide for regulation of the passage of fluid through said oppositely disposed piston rod apertures.

9. In a device of the character described, a casing adapted to contain a fluid, a piston in said casing, a hollow piston rod open at its inner end to the interior of said casing on one side of said piston and having an aperture in its wall on the opposite side of said piston, a spring-pressed plunger in said hollow piston rod, said plunger having a valved passage therethrough, and a tubular valve within said hollow piston rod, said valve having a slot in its wall adapted to register with the aperture in said hollow piston rod, said casing and said piston rod being adapted to be connected to relatively movable parts of a vehicle.

10. In a device of the character described, a casing adapted to contain a fluid, a piston dividing the interior of said casing into two fluid chambers and provided with an opening connecting said fluid chambers, a hollow piston rod having a fluid reservoir chamber in its outer portion and open at its inner end to one of said casing chambers through said piston opening, said piston rod being provided with an aperture in its wall communicating with the other casing chamber, a tubular valve in said casing extending into said hollow piston rod, said valve having an opening in its wall adapted to be brought into and out of register with said piston rod aperture, and a check valve controlling the passage of fluid from said reservoir chamber, said casing and said piston rod being adapted to be connected to relatively movable parts of a vehicle.

11. In a device of the character described, a casing adapted to contain a fluid, a piston in said casing, a hollow piston rod providing a passage for fluid from one side of said piston to the other, and a tapered valve member mounted in said casing and extending into said hollow piston rod to control said passage, said casing and said piston rod being adapted to be connected to relatively movable parts of a vehicle.

12. In a device of the character described, a casing adapted to contain a fluid, a piston in said casing, a hollow piston rod providing a passage for fluid from one side of said piston to the other, a tapered valve member adjustably mounted in said casing and extending into said hollow piston rod to control said passage, said piston being provided with an auxiliary passage for fluid therethrough, and a check valve therefor.

13. In a device of the character described, a casing adapted to contain a fluid, a piston in said casing, a hollow piston rod providing a passage for fluid from one side of said piston to the other, a tapered valve member mounted in said casing and extending into said hollow piston rod to control said passage, said piston rod having a fluid reservoir chamber therein, a valved plunger between said reservoir chamber and said piston, said casing and said piston rod being adapted to be connected to relatively movable parts of a vehicle.

LOUIS L. LOMAR.